United States Patent Office 2,779,789
Patented Jan. 29, 1957

2,779,789
REDUCTIVE ALKYLATION PROCESS

Robert H. Rosenwald, Western Springs, and James R. Hoatson, Clarendon Hills, Ill., assignors to Universal Oil Products Company, Des Plaines, Ill., a corporation of Delaware No Drawing. Application October 28, 1953, Serial No. 388,917

16 Claims. (Cl. 260—577)

This application is a continuation-in-part of our co-pending application Serial No. 162,138, filed May 15, 1950, now abandoned, and relates to a reductive alkylation process and more particularly to a process for the reductive alkylation of an organic compound having an amino or nitro substituent. Still more particularly, the present invention relates to the use of a novel catalyst for this purpose.

Products formed by the reductive alkylation of an organic compound having an amino and/or nitro substituent and ketones or aldehydes with hydrogen are desirable for various uses. For example, the reductive alkylation of p-nitroaniline or p-phenylene diamine with a ketone produces an N,N'-di-secondary-alkyl-p-phenylene diamine which is very desirable as an inhibitor to prevent oxidative deterioration of unstable organic compounds and more particularly of motor fuel and still more particularly of cracked gasoline. Similarly, the reductive alkylation of p-nitrophenol or p-aminophenol with a ketone produces an N-secondary-alkyl-p-aminophenol which is also a useful inhibitor. The reductive alkylation product of these and other organic compounds containing these substituents also may find utility as dyes, intermediates in the preparation of pharmaceuticals, etc. In the past, reductive alkylation processes have been effected in the presence of metal oxide catalysts. These metal oxide catalysts unfortunately undergo rapid deterioration in use and, therefore, require frequent replacement. This is particularly troublesome in continuous processes. Another disadvantage to the use of the metal oxide catalysts is that they hydrogenate the excess ketone used in the process and form alcohols which results in a difficult separation problem, as well as in a loss of desired ketones for recycling within the process for further use therein. The present invention provides for the use of a novel catalyst which avoids the objections hereinbefore set forth.

In one embodiment the present invention relates to a process for the reductive alkylation of a compound having a substituent selected from amino and nitro groups, which comprises reacting said compound and a carbonyl compound, selected from ketones and aldehydes, with hydrogen in the persence of a platinum-containing catalyst, said catalyst having been pretreated with a reducing agent at a temperature of above about 200° F.

In a specific embodiment the present invention relates to a process for the reductive alkylation of an aromatic compound having a substituent selected from amino and nitro groups, which comprises reacting said aromatic compound and a carbonyl compound selected from ketones and aldehydes with hydrogen in the presence of a platinum-containing catalyst having not more than about 2% by weight of platinum, said catalyst having been reduced with hydrogen at a temperature of above about 600° F.

In a more specific embodiment the present invention relates to a method of preparing N,N'-di-secondary-butyl-p-phenylene diamine which comprises reacting methyl ethyl ketone and a compound selected from p-nitroaniline and p-phenylene diamine with hydrogen in the presence of a catalyst comprising a difficultly reducible oxide and from about 0.01% to about 2% by weight of platinum, at a temperature of from about 50 to about 500° F. and a pressure of from about 100 to about 3000 pounds per square inch, said catalyst having been reduced with hydrogen at a temperature of from about 600° to about 800° F.

In another embodiment the present invention relates to a method of preparing N-(3-heptyl)-p-aminophenol which comprises reacting ethyl butyl ketone with a compound selected from p-nitrophenol and p-aminophenol with hydrogen in the presence of a catalyst comprising a difficultly reducible metal oxide and platinum, said catalyst having been pretreated with a reducing agent at a temperature above about 200° F.

As hereinbefore set forth the present invention is directed to the reductive alkylation of an amino or nitro compound. The present invention is particularly applicable to the reductive alkylation of aromatic compounds containing one or more amino and/or nitro groups. Typical aromatic compounds which may be treated in the present invention include nitrobenzene, dinitrobenzene, trinitrobenzene, etc., aniline, diaminobenzene, triaminobenzene, etc., aminonitrobenzene, diaminonitrobenzene, aminodinitrobenzene, etc., similarly substituted naphthalenes, anthracenes, etc., aromatic compounds containing one or more hydroxy groups in addition to amino and/or nitro groups, such as nitrophenol, aminophenol, nitroaminophenol, etc. It is understood that the aromatic compound may contain other substituents and particularly hydrocarbon groups attached to the ring. Preferred aromatic compounds for conversion in the present invention comprise, p-nitroaniline, p-phenylene diamine p-nitrophenol and p-aminophenol.

While the present invention is particularly applicable to the reductive alkylation of aromatic compounds containing nitro and/or amino substituents, it is understood that the invention may be used for the reductive alkylation of other nitro and/or amino compounds including ammonia, aliphatic amines, alkanol amines, etc. The aliphatic amines may contain one or more amino groups and include compounds as methyl amine, ethyl amine, propyl amine, butyl amine, amyl amine, hexyl amine, heptyl amine, octyl amine, etc., ethylene diamine, propylene diamine, butylene diamine, amylene diamine, etc., trimethylene diamine, tetramethylene diamine, pentamethylene diamine, hexamethylene diamine, etc., diethylene triamine, dipropylene triamine, etc., alkanol amines include ethanol amine, propanol amine, butanol amine, pentanol amine, hexanol amine, heptanol amine, octanol amine, etc., diethanol amine, triethanol amine, etc.

Any suitable ketone and/or aldehyde may be utilized. Ketones are particularly preferred when it is desired to form the N,N'-di-secondary-alkyl, N-secondary-alkyl, etc. substituted product. Suitable ketones include acetone, methyl ethyl ketone, methyl propyl ketone, methyl butyl ketone, methyl amyl ketone, methyl hexyl ketone, methyl heptyl ketone, methyl octyl ketone, etc., ethyl ethyl ketone, ethyl propyl ketone, ethyl butyl ketone, ethyl amyl ketone, ethyl hexyl ketone, ethyl heptyl ketone, etc., propyl propyl ketone, propyl butyl ketone, propyl amyl ketone, propyl hexyl ketone, etc., butyl butyl ketone, butyl amyl ketone, butyl hexyl ketone, etc. Other suitable but not necessarily equivalent ketones comprise cyclic ketones including cyclohexanone, benzophenone, etc., alkyl aryl ketones, alkyl cyclohexyl ketones, aryl aryl ketones, aryl cyclohexyl ketones, etc., including compounds as acetophenone, ethyl phenyl ketone, propyl phenyl ketone, butyl phenyl ketone, amyl phenyl ketone, etc., methyl cyclohexyl ketone, ethyl cyclohexyl ketone, propyl cyclohexyl ketone, butyl cyclohexyl ketone, etc. It is understood that mixtures of ketones may be utilized when desired.

The aldehydes are employed when it is desired to produce N,N'-di-alkyl, N,N,N',N'-tetra-alkyl or a mixture of substituted phenylene diamines. Suitable aldehydes include formaldehyde, acetaldehyde, propionaldehyde, butyraldehyde, valeraldehyde, etc. It is understood that the particular aldehyde to be employed will depend upon the particular product desired. Similarly, it is understood that mixtures of aldehydes may be utilized when desired.

The present invention is particularly applicable to the reductive alkylation of p-nitroaniline, p-phenylene diamine, p-nitrophenol or p-aminophenol with a ketone to produce an N,N'-di-secondary-alkyl-p-phenylene diamine or an N-secondary-alkyl-p-aminophenol, both of which, as hereinbefore set forth, are particularly desirable for use as oxidation inhibitors in unstable organic compounds and still more particularly in cracked gasoline. In the interest of simplicity, the following description will be directed to the reductive alkylation of p-nitroaniline and methyl ethyl ketone, with the understanding that the process is applicable to the reaction of other compounds containing these substituents and aldehydes or other ketones, with suitable modifications in operating conditions, when necessary, and with the understanding that the products are not necessarily equivalent.

The reductive alkylation of p-nitroaniline and/or p-phenylene diamine with ketones and/or aldehydes is readily effected at a temperature of from about 50° to about 500° F. and a pressure of from about 100 to 3000 pounds or more per square inch. Hydrogen is utilized in an amount of at least one mol of hydrogen per mol of p-nitroaniline and/or p-phenylene diamine. When p-nitroaniline is utilized and it is desired to obtain complete reductive alkylation, at least five mols of hydrogen per mol of p-nitroaniline is necessary. Similarly, with p-phenylene diamine, at least two mols of hydrogen per mol of p-phenylene diamine is necessary. In general it is preferred to operate with a slight molar excess of hydrogen over that required stoichiometrically.

As hereinbefore set forth one of the features of the present invention is the use of a platinum-containing catalyst which has been pretreated with a reducing agent at a temperature of above about 200° F. As will be shown in the following examples the use of a catalyst treated in this manner produced unexpectedly higher yields of the desired N,N'-di-secondary-p-phenylene diamine and N-secondary-alkyl-p-aminophenol. In addition to the higher yields of the desired products, the novel catalyst of the present invention does not produce substantial amounts of undesired products, such as mono-alkylated products when used with p-nitroaniline or p-phenylene diamine, does not effect saturation of the aromatic ring, does not reduce the ketones to alcohols, etc. It is apparent that these improved results are of considerable importance from a commercial viewpoint in the production of the desired reductive alkylation products.

The catalyst of the present invention may be prepared in any suitable manner. The preferred catalyst contains not more than about 2% by weight of platinum as it has been found and will be shown in the following examples that the use of a catalyst containing less than 2% by weight of platinum does not produce ring hydrogenation of the aromatic compound or hydrogenation of the ketone to the alcohol, whereas the use of a catalyst containing 2% by weight of platinum will result in these undesirable side hydrogenation reactions. It is apparent that even higher platinum concentrations will produce these undesired side reactions to even a greater extent. A further advantage to the use of the low platinum concentration catalyst of the present invention is, contrary to expectations, the fact that substantially no monoalkylated p-phenylene diamine is present in the products when the starting material is p-nitroaniline and p-phenylene diamine. A still further advantage is the considerably lower cost of the catalyst.

Any suitable carrier or supporting component may be utilized with the low concentrations of platinum. A particularly preferred support comprises alumina, which may be naturally occurring or synthetically prepared. The synthetically prepared alumina is readily manufactured by the reaction of a suitable basic compound such as ammonium hydroxide, ammonium carbonate, sodium hydroxide, sodium carbonate, potassium hydroxide, etc., with an aluminum salt such as aluminum chloride, aluminum sulfate, aluminum nitrate, aluminum acetate, etc. The resultant aluminum hydroxide is preferably washed to remove soluble impurities and then may be composited with the platinum or may first be dried at a temperature of from about 200° to about 500° F. or more for a period of from about 2 to 24 hours or more and then calcined at a temperature of from about 800° to 1400° F. or more, and then composited with the platinum. Other suitable but not necessarily equivalent supporting components include silica, asbestos, charcoal, zinc oxide, magnesium oxide, molybdenum oxide, thorium oxide, zirconium oxide, silica-alumina, silica-zirconia, silica-magnesia, silica-thoria, silica-alumina-zirconia, silica-alumina-magnesia, silica-alumina-thoria, silica-zirconia-thoria, zirconia-magnesia-thoria, etc. The supporting component preferably is difficultly reducible in order to avoid conversion of the supporting component during the reductive alkylation reaction and in a preferred embodiment the support comprises a difficultly reducible metal oxide.

The platinum may be composited with the support in any suitable manner. Preferably, the platinum is utilized in the form of a water soluble compound. A particularly preferred source of platinum is chloroplatinic acid because of its ready availability and lower cost. Other suitable but not necessarily equivalent platinum compounds include ammonium platinum chloride, trimethylbenzyl ammonium platinum chloride, tetraamino-platino chloride, ammonium-platinonitrite, etc. In one method of manufacture, a solution of the platinum compound is commingled with the supporting component and the mixture is evaporated to dryness, after which it is ground and, when desired, formed into particles of uniform or irregular size and shape by pelleting, extrusion, etc. When desired, the catalyst may contain acidic components such as combined halogen and particularly fluorine and/or chlorine. The concentration of the halogen generally will be within the range of from about 0.1% to about 8% by weight of the final catalyst. When both fluorine and chlorine are present in the catalyst, the total halogen content will be within the range hereinbefore set forth. In another method of operation and particularly when the support comprises alumina, silica, silica-alumina, etc., the support may be formed into spheres in any suitable manner and then is composited with the platinum and subsequently is dried and calcined. After the platinum has been composited with the support, the composite is calcined in air at a temperature of from about 800° to 1200° F. for a period of from about 2 to 8 hours or more. In some cases the calcination treatment in air may be eliminated.

In accordance with the present invention the catalyst as prepared in the manner hereinbefore set forth is subjected to pretreatment prior to use. This pretreatment is effected with a reducing agent at a temperature above about 200° F. and preferably above about 600° F. It is an essential feature of this invention that the temperature of pretreatment be above about 200° F. because lower temperatures will not produce the desired results. The exact temperature of the pretreatment will depend upon the particular method in which the catalyst is prepared. In certain cases, satisfactory results are obtained with temperatures of from about 200° F. to about 600° F., while in other cases the temperature of pretreatment must be above about 600° F., and in still other cases, the temperature of pretreatment should be above about 800°

F. In general, it is not necessary to utilize temperatures above about 1200° F.

In a preferred manner, the pretreatment is effected with hydrogen. In another preferred embodiment, the pretreatment may be effected with a mixture of hydrogen and a hydrocarbon. In some cases, the reducing agent may comprise a compound which will be a hydrogen donor, but which will not undergo substantial decomposition under the conditions of treatment. In still other cases, the pretreatment may be effected with a hydrocarbon but not necessarily with equivalent results. The hydrocarbon may be selected from a wide variety of compounds and a mixture of compounds, including paraffins and isoparaffins ranging from propane to dodecane and higher boiling paraffins, olefins, naphthenes, including cyclohexane, etc., aromatics, gasoline, naphthas, etc.

The time of the pretreatment will be correlated with the temperature, a higher temperature generally requiring a shorter time. The time will range from one hour or less to twelve hours or more. The pressure of pretreatment may vary from atmospheric to 2000 pounds per square inch or more. In some cases, improved results are obtained when the pretreatment is effected at a superatmospheric pressure which preferably is within the range of from about 300 to 2000 pounds or more.

The reductive alkylation reaction may be effected in either batch or continuous operations. The present invention is particularly adapted for use in a continuous process because of the long catalyst life which thereby permits long runs without interruptions for catalyst replacement. Also, as hereinbefore set forth, the process does not produce undesirable side reaction products and, therefore, will not require excessive fractionation or other separating means to recover the desired products. These advantages are also applicable to a batch type process.

As hereinbefore set forth, the temperature for the reductive alkylation is within the range of from about 50° to about 500° F. In general, it is preferred to utilize as low a temperature as satisfactory because the reaction is exothermic and will increase the temperature. Therefore, it is preferred to provide means for cooling the reaction mixture and this may be accomplished in any suitable manner which will depend upon the particular plant apparatus employed. In one method the reaction chamber may be surrounded by a suitable liquid which will vaporize at the desired temperature and will absorb the exothermic heat of reaction due to the latent heat of vaporization. Other methods are well-known in the art and may be employed.

As hereinbefore set forth, the present invention is particularly advantageous with continuous type processes. In the continuous type process the catalyst is deposited in a reaction zone and the reactants, at the proper temperature and pressure, are introduced into the reaction zone in either upward or downward flow. The effluent products from the reaction zone are subjected to fractionation or other suitable means to separate the desired products from hydrogen and unreacted ketone, the latter two preferably being recycled for further use in the process. Another type of continuous processes comprises the slurry or suspensoid type in which the catalyst is carried into the reaction zone by means of one or more of the reactants. In a batch type operation the catalyst is preferably first placed in a suitable reaction zone and the reactants, at a suitable temperature and pressure, are introduced into the reaction zone and kept therein for the desired time. The products are then withdrawn from the reaction zone and separated by suitable means.

While the present invention is particularly applicable to the reductive alkylation of a p-nitroaniline, p-phenylene diamine, p-nitrophenol and p-aminophenol, as hereinbefore set forth other organic compounds containing these substituents may be reacted in accordance with the present invention but not necessarily with equivalent results. Typical examples of other organic compounds include mono- and poly-nitrocyclohexanes and/or aminocyclohexanes, similarly substituted 5 membered cycloalkyl compounds, similarly substituted pyridine compounds, pyrrole compounds, pyrrolidine compounds, pyrazole compounds, furan compounds, thiophene compounds, etc.

The following examples are introduced to illustrate further the novelty and utility of the present invention but not with the intention of unduly limiting the same.

EXAMPLE I

This example shows the beneficial effects obtained by high temperature pretreatment with a reducing agent of the catalyst prior to use in the reductive alkylation process. An activated alumina of commerce in the form of ⅛" x ⅛" pills, originally prepared from sodium aluminate, was used as the support. An aqueous solution of chloroplatinic acid was commingled with these pills in an amount to form a final catalyst containing 0.3% by weight of platinum, and the solution was evaporated to dryness, and calcined at a temperature of 932° F. for 3 hours in a stream of air.

A portion of the catalyst as described above was pretreated in the presence of hydrogen and straight run naphtha at a temperature of 842° F. and a pressure of 500 pounds per square inch for 20 hours. This catalyst contained 0.5% by weight of carbon and is hereinafter referred to as catalyst A. Another portion of the catalyst without the heat treatment in the presence of the reducing agent was also tested and is hereinafter referred to as catalyst B.

These catalysts were utilized for the reductive alkylation of p-nitroaniline and methyl ethyl ketone at a temperature of 320° F., with a hydrogen pressure of about 1500 pounds, and utilizing a mol ratio of methyl ethyl ketone to p-nitroaniline of 8:1. The results of these runs are shown in the following table:

*Table I*

| Catalyst | Hydrogen Absorbed, Lbs. per square inch | Yields, Weight Percent Theoretical | | |
|---|---|---|---|---|
| | | N,N'-di-secondary-butyl-p-phenylene diamine | N-secondary-butyl-p-phenylene diamine | p-phenylene diamine |
| Catalyst A (pretreated with reducing agent)_ | 960 | 94.3 | none | none |
| Catalyst B (Not pretreated with reducing agent)_ | 825 | 42.6 | 38.1 | 16.7 |

It will be noted from the data in the above table that the catalyst which had been pretreated with a reducing agent produced a yield of 94.3% by weight of the theoretical yield of the desired N,N'-di-secondary-butyl-p-phenylene diamine without any production of undesired mono- or unsubstituted products. Further, it will be noted that in the run with the pretreated catalyst 960 pounds of hydrogen were absorbed. On the other hand, the catalyst which had not been pretreated resulted in a hydrogen absorption of only 825 pounds and produced only 42.6% by weight of the theoretical yield of N,N'-di-secondary-butyl-p-phenylene diamine. Of utmost importance is the fact that this catalyst also resulted in the production of a total of approximately 55% of undesired mono- and unsubstituted p-phenylene diamines.

EXAMPLE II

This example also shows the beneficial effect obtained by the high temperature pretreatment. The catalyst used in this example was prepared by the reaction of ammonium hydroxide with aluminum chloride to form aluminum hydroxide which was thoroughly washed to remove soluble impurities. An aqueous solution of hydrogen fluoride was added during the last wash to include in the catalyst a fluorine content of about 0.3% by weight. The composite was dried at a temperature of about 350° F. for about 16 hours, commingled with a lubricant and formed into pills, after which the pellets were calcined in air at a temperature of about 932° F. for about 4 hours. An aqueous chloroplatinic acid solution was commingled with the pills to form a final catalyst containing 0.3% by weight of platinum, the pills evaporated to dryness and then calcined at a temperature of 932° F. in air for about 4 hours.

A portion of the catalyst was pretreated in the presence of hydrogen and normal nonane at 860° F., a pressure of 500 pounds per square inch for 6 hours. This catalyst is hereinafter referred to as catalyst C. Another portion of the catalyst without pretreatment was also tested, and is hereinafter referred to as catalyst D.

Table II

| Catalyst | Hydrogen Absorbed, Lbs. per square inch | Yields, Weight Percent Theoretical | | |
|---|---|---|---|---|
| | | N,N'-di-secondary-butyl-p-phenylene diamine | N-secondary-butyl-p-phenylene diamine | p-phenylene diamine |
| Catalyst C (pretreated with reducing agent) | 1,020 | 93 | none | none |
| Catalyst D (not pretreated with reducing agent) | 765 | 42 | 41 | 12.2 |

Here again it will be noted that the pretreated catalyst produced 93% by weight of the theoretical yield of the desired N,N'-di-secondary-butyl-p-phenylene diamine. Further, this catalyst produced no side products as were produced in an amount of 53.2% with the catalyst which had not been pretreated. Also, it will be noted that the hydrogen absorbed was considerably greater with the pretreated catalyst, indicating more complete reaction.

EXAMPLE III

This example shows the effect of the platinum concentration in the catalyst. The different samples were all prepared in substantially the same manner except for the amount of platinum. An aqueous chloroplatinic acid solution was commingled with activated alumina of commerce followed by drying and calcining as hereinbefore set forth. These catalysts were pretreated with hydrogen at a temperature of 212° F. for 4 hours and 392° F. for 3 hours. It will be noted that this example shows the effect of platinum concentration.

The different catalysts were utilized for the reductive alkylation of p-nitroaniline and methyl ethyl ketone with hydrogen under substantially the same conditions as set forth in Example I. The results of these runs are indicated in the following table.

At the time these runs were made, the potency of the product was determined by the potency thereof as an oxidation inhibitor in gasoline. A commercial N,N'-di-secondary-butyl p-phenylene diamine gasoline inhibitor was assigned an arbitrary value of 1.00 and the products formed in these runs were compared thereto and are reported in the following table on an inhibitor ratio basis.

Table III

| Catalyst | Inhibitor Ratio | Vacuum Distillate, Weight in gms. |
|---|---|---|
| Catalyst E (0.05% platinum) | .94 | 48.7 |
| Catalyst F (0.1% platinum) | .98 | 43.7 |
| Catalyst G (0.3% platinum) | .89 | 36.3 |
| Catalyst H (2% platinum) | .84 | 35.1 |

The charge to each of these runs comprised 0.25 mol of p-nitroaniline (34.5 gms.) which would give 100% theoretical yield of 55 gms. of N,N'-di-secondary-butyl-p-phenylene diamine. However, upon the formation of either the mono-substituted or the unsubstituted p-phenylene diamine, the theoretical yield decreases to 41 and 27 gms. respectively. This product is that remaining after vacuum distillation to remove methyl ethyl ketone, water, hydrogen, etc.

It will be noted that the yield of product is higher with the lower platinum concentrations, and this, therefore, indicates that a high platinum concentration forms a catalyst which is too active. It is believed that the mechanism with the higher platinum concentration catalysts is first to form the N,N'-di-alkylated product and then the too active catalyst effects decomposition of the product by splitting off of secondary-butyl amine. Further, the too active catalyst results in hydrogenation of the benzene ring. In any event, it is apparent from these data that the catalyst containing 2% platinum is not as satisfactory as the catalysts having lower platinum concentrations in both the yield of recovered products and in the potency of the product as indicated by the inhibitor ratios. This is surprising because it would be expected that a higher platinum concentration would result in more complete hydrogenation. However, as hereinbefore set forth, for this particular reaction, complete hydrogenation is undesirable. Still another advantage to the lower platinum concentrations is in the cost of the platinum which, being considerable, may preclude its use commercially. Thus, the use of catalysts having platinum concentrations of below about 2% offers numerous advantages as hereinbefore set forth.

A catalyst containing 0.3% by weight of platinum and prepared in substantially the same manner as catalysts E to H but pretreated at a temperature of 932° F. produced 51 gms. of vacuum distillate having an inhibitor ratio of 1.04. With this particular catalyst, it appears that the higher temperatures of pretreatment are desired in order to produce the more active catalyst.

EXAMPLE IV

In order to show the necessity for the platinum in the catalyst, another run was made under substantially the same conditions using alumina as the sole catalytic agent. After a period of 3 hours, no hydrogen was consumed and this, therefore, shows that the reaction did not occur in the presence of alumina as the sole catalytic agent.

EXAMPLE V

In the previous examples, alumina was used as the support. This example illustrates the use of other supports with 0.3% by weight of platinum.

The supports used in this example comprised char, asbestos and silica, and the catalysts were prepared by commingling chloroplatinic acid with the support, followed by drying, calcining and pretreating with hydrogen at a temperature of 212° F. for 4 hours and 392° F. for 3 hours. The reductive alkylation runs were made under the same conditions as hereinbefore set forth in Example I. The results of these runs are indicated in the following table:

Table IV

| Catalyst | Inhibitor Ratio of Vacuum Distillate |
|---|---|
| Catalyst I (Char) | 1.04 |
| Catalyst J (Asbestos) | .98 |
| Catalyst K (Silica) | .98 |

It will be noted that these other supports were very satisfactory for use with the low platinum concentration catalyst.

EXAMPLE VI

This example illustrates the longer life obtained with the high temperature pretreated catalyst (catalyst A of Example I) as compared to the catalyst which had not been subjected to the pretreatment. Both of the catalysts contained 0.3% by weight of platinum and both were tested under the conditions as set forth in Example I.

The pretreated catalyst gave, as indicated for catalyst A in Example 1, 94.3% by weight of the theoretical yield in the first run of 6 hours duration. The same catalyst was used for 14 more runs or a total of 90 hours, and the yield in the last run was 82% by weight of the theoretical yield of N,N'-secondary-butyl-p-phenylene diamine.

A catalyst which had not been pretreated at high temperatures prior to use as indicated for catalyst D in Example II gave 42% by weight of the theoretical yield of N,N'-di-secondary-butyl-p-phenylene diamine in the first run of 6 hours duration and after 7 more runs of similar duration or a total of 48 hours gave only 22.5% by weight of the theoretical yield. It will be noted that the life of this catalyst was short and in addition, as hereinbefore set forth, this catalyst produced an excessive amount of mono-substituted and unsubstituted p-phenylene diamines. Although the runs of this example were made in a batch operation, it is apparent that the catalyst of considerably longer life lends itself to ready adaptation for use in a continuous type flow process, and this offers a further advantage for the improved catalysts of the present invention.

EXAMPLE VII

The catalysts used in this example were prepared in substantially the same manner as described in Example II. A portion of the catalyst was pretreated with a heptane fraction at about 600° F. and at atmospheric pressure for 4½ hours. The pretreated catalyst and another portion of the catalyst which had not been pretreated were each separately evaluated for activity in the reductive alkylation of p-nitroaniline with methyl ethyl ketone at 320° F. and about 1500 pounds of hydrogen pressure.

The run utilizing the catalyst which had not been pretreated yielded 80 weight percent of the theoretical yield of N,N'-di-secondary-butyl-p-phenylene diamine. In contrast thereto, the run utilizing the pretreated catalyst yielded 98 weight percent of the theoretical yield of N,N'-di-secondary-butyl-p-phenylene diamine.

EXAMPLE VIII

This example illustrates the use of the pretreated catalyst of the present invention in the reductive alkylation of p-nitrophenol with ethyl butyl ketone. The catalyst was prepared in substantially the same manner as described in Example II and then was pretreated with a heptane fraction at about 660° F. for five hours. The reductive alkylation was effected at a temperature of 320° F. and 100 atmospheres of hydrogen. This resulted in an 85.6 weight percent yield of the desired N-(3-heptyl)-p-aminophenol.

We claim as our invention:

1. In the reductive alkylation of a reductively alkylatable compound having a substituent selected from the group consisting of amino and nitro groups with a carbonyl compound selected from the group consisting of ketones and aldehydes, the improvement which comprises effecting said reductive alkylation with hydrogen in the presence of a platinum-containing catalyst containing not more than about 2% by weight of platinum, said catalyst having been pretreated with a reducing agent selected from the group consisting of hydrogen, hydrocarbon and mixtures thereof at a temperature of above about 200° F.

2. In the reductive alkylation of an aromatic compound having a substituent selected from the group consisting of amino and nitro groups with a carbonyl compound selected from the group consisting of ketones and aldehydes, the improvement which comprises effecting said reductive alkylation with hydrogen in the presence of a catalyst comprising a solid support and from about 0.01% to about 2% by weight of platinum, said catalyst having been pretreated with a reducing agent selected from the group consisting of hydrogen, hydrocarbon and mixtures thereof at a temperature of from about 600° F. to about 1200° F.

3. A process for the reductive alkylation of an aromatic compound having a substituent selected from the group consisting of amino and nitro groups which comprises reacting said aromatic compound with a carbonyl compound selected from the group consisting of ketones and aldehydes at a temperature of from about 50° to about 500° F. and a pressure of from about 100 to about 3000 pounds per square inch with at least one mol of hydrogen per mol of said aromatic compound in the presence of a catalyst comprising a solid support and from about 0.01% to about 2% by weight of platinum, said catalyst having been pretreated with a reducing agent selected from the group consisting of hydrogen, hydrocarbon and mixtures thereof at a temperature of above about 200° F.

4. The process of claim 3 further characterized in that said aromatic compound is p-nitroaniline.

5. The process of claim 3 further characterized in that said aromatic compound is p-phenylene diamine.

6. The process of claim 3 further characterized in that said aromatic compound is p-nitrophenol.

7. The process of claim 3 further characterized in that said aromatic compound is p-aminophenol.

8. A process for the reductive alkylation of an aromatic compound having a substituent selected from the group consisting of amino and nitro groups which comprises reacting said aromatic compound and a carbonyl compound selected from the group consisting of ketones and aldehydes at a reductive alkylation temperature with at least one mol of hydrogen per mol of said aromatic compound in the presence of a catalyst comprising a difficultly reducible oxide and from about 0.01% to about 2% by weight of platinum, said catalyst having been pretreated with a reducing agent selected from the group consisting of hydrogen, hydrocarbon and mixtures thereof at a temperature of from about 600° F. to about 1200° F.

9. A process for the reductive alkylation of an aromatic compound having a substituent selected from the group consisting of amino and nitro groups which comprises reacting said aromatic compound and a carbonyl compound selected from the group consisting of ketones and aldehydes at a reductive alkylation temperature and a pressure of from about 100 to about 3000 pounds per square inch with at least one mol of hydrogen per mol of said aromatic compound in the presence of a catalyst comprising a difficultly reducible oxide, from about 0.01% to about 2% by weight of platinum and from about 0.1% to about 8% by weight of combined fluorine, said catalyst having been pretreated with a reducing agent selected from the group consisting of hydrogen, hydrocarbon and mixtures thereof at a temperature of from about 800° to about 1200° F.

10. A process for the reductive alkylation of an aromatic compound selected from the group consisting of p-nitroaniline, p-phenylene diamine, p-nitrophenol and p-aminophenol, which comprises reacting said aromatic compound and a carbonyl compound selected from the group consisting of ketones and aldehydes at a temperature of from about 50 to about 500° F. and a pressure of from about 100 to about 3000 pounds per square inch with at least one mol of hydrogen per mol of said aromatic compound in the presence of a catalyst comprising alumina and from about 0.01% to about 2% by weight of platinum, said catalyst having been pretreated with a reducing agent selected from the group consisting of hydrogen, hydrocarbon and mixtures thereof at a temperature from about 600 to about 1200° F.

11. A process for the reductive alkylation of p-nitroaniline which comprises reacting said p-nitroaniline and a ketone at a temperature of from about 50 to about 500°

F. and a pressure of from about 100 to about 3000 pounds per square inch with at least one mol of hydrogen per mol of said p-nitroaniline in the presence of a catalyst comprising alumina and from about 0.01% to about 2% by weight of platinum, said catalyst having been pretreated with hydrogen at a superatmospheric pressure and a temperature of from about 600 to about 1200° F.

12. A process for the reductive alkylation of p-nitroaniline which comprises reacting said p-nitroaniline and a ketone at a temperature of from about 50 to about 500° F. and a pressure of from about 100 to about 3000 pounds per square inch with at least one mol of hydrogen per mol of said p-nitroaniline in the presence of a catalyst comprising alumina and from about 0.01% to about 2% by weight of platinum, said catalyst having been pretreated with a hydrocarbon at a superatmospheric pressure and a temperature of from about 600 to about 1200° F.

13. A process for the reductive alkylation of p-phenylene diamine which comprises reacting said p-phenylene diamine and a ketone at a temperature of from about 50 to about 500° F. and a pressure of from about 100 to about 3000 pounds per square inch with at least one mol of hydrogen per mol of said p-phenylene diamine in the presence of a catalyst comprising alumina and from about 0.01% to about 2% by weight of platinum, said catalyst having been pretreated with a hydrocarbon at a superatmospheric pressure and a temperature of from about 600 to about 1200° F.

14. A process for the reductive alkylation of p-aminophenol which comprises said p-aminophenol and a ketone at a temperature from about 50 to about 500° F., and a pressure of from about 100 to about 3000 pounds per square inch with at least one mol of hydrogen per mol of said p-aminophenol in the presence of a catalyst comprising alumina and from about 0.01% to about 2% by weight of platinum, said catalyst having been pretreated with hydrogen at a superatmospheric pressure and a temperature of from about 600 to about 1200° F.

15. A process for the preparation of N,N'-di-secondary-butyl-p-phenylene diamine which comprises reacting p-nitroaniline and methyl ethyl ketone at a reductive alkylation temperature and a pressure of from about 100 to about 3000 pounds per square inch with at least one mol of hydrogen per mol of p-nitroaniline in the presence of a catalyst comprising alumina and platinum in a concentration of from about 0.01% to about 2% by weight, said catalyst having been pretreated with hydrogen at a superatmospheric pressure and a temperature of from about 600° to about 1200° F.

16. A process for the preparation of N,N'-di-secondary-butyl-p-phenylene diamine which comprises reacting p-phenylene diamine and methyl ethyl ketone at a reductive alkylation temperature and a pressure of from about 100 to about 3000 pounds per square inch with at least one mol of hydrogen per mol of p-phenylene diamine in the presence of a catalyst comprising alumina and platinum in a concentration of from about 0.01% to about 2% by weight, said catalyst having been pretreated with a hydrocarbon at a superatmospheric pressure and a temperature of from about 600° to about 1200° F.

References Cited in the file of this patent

UNITED STATES PATENTS 2,475,155     Rosenblatt _____ July 5, 1949

OTHER REFERENCES

Adams et al.: JACS, vol. 45, pp. 2171-9 (1923).
Alexander et al.: JACS (1948), vol. 70, pp. 1315-6.
Adams et al.: Org. Reactions (1948), vol. IV, p. 197.
Major: JACS, (1931), vol. 53, pp. 4373-5.